US008024519B2

(12) United States Patent
Lehr et al.

(10) Patent No.: US 8,024,519 B2
(45) Date of Patent: Sep. 20, 2011

(54) CATALOG RECOVERY THROUGH SYSTEM MANAGEMENT FACILITIES REVERSE TRANSVERSAL

(75) Inventors: Douglas Lee Lehr, Tucson, AZ (US); Franklin Emmert McCune, Tucson, AZ (US); David Charles Reed, Tucson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 537 days.

(21) Appl. No.: 12/235,369

(22) Filed: Sep. 22, 2008

(65) Prior Publication Data

US 2010/0077255 A1   Mar. 25, 2010

(51) Int. Cl.
*G06F 12/00* (2006.01)

(52) U.S. Cl. ........ 711/114; 711/161; 711/162; 711/202; 714/6

(58) Field of Classification Search .................. 711/114, 711/162, 161, 202; 714/6
See application file for complete search history.

(56) References Cited

U.S. PATENT DOCUMENTS

| 4,408,273 | A | 10/1983 | Plow |
| 6,675,175 | B2 | 1/2004 | Branch et al. |
| 7,158,999 | B2 | 1/2007 | Pace et al. |
| 2001/0011320 | A1* | 8/2001 | Chevallier ............... 711/103 |
| 2003/0084268 | A1 | 5/2003 | Mashima |
| 2004/0107325 | A1 | 6/2004 | Mori |
| 2006/0004846 | A1 | 1/2006 | Murley et al. |
| 2007/0088769 | A1 | 4/2007 | Pace et al. |
| 2007/0113157 | A1 | 5/2007 | Perego |

OTHER PUBLICATIONS

Ferguson, K. Ronald; "Considerations for ICF Catalog Backup/Recovery and Day-to-Day ICF Catalog Management . . . "; A VSAM/ICF Catalog; Jan. 23, 2001; 006-0105-02; pp. 1-8; Mainstar Software Corporation 2001.

Tate et al.; "Enhanced Catalog Sharing and Management"; IBM Redbooks, Jul. 1999; SG24-5594-00; pp. 1-148; IBM; USA.

* cited by examiner

*Primary Examiner* — Jae U Yu
(74) *Attorney, Agent, or Firm* — Dale F. Regelman; Quarles & Brady LLP

(57) ABSTRACT

A method for forward recovery of a catalog of a data storage system, comprising providing a recovery catalog and SMF records. In reverse chronological order, the (i)th entry of the record is checked for a data set change command. If none, the next entry is examined. Otherwise, the (j)th data set is identified and checked for inclusion in the recovery catalog. If it already is, the next entry is selected. If not, a data set location record is added. This process is repeated for each entry in the SMF record. Next, a (h)th data set on the (k)th volume is selected and checked for inclusion in the recovery catalog. If that (h)th data set has been added to the recovery catalog, a next data set is selected. Otherwise, a data set location record for the (h)th data set is added. The process is repeated for each data set on each volume.

22 Claims, 6 Drawing Sheets

CATALOG RECOVERY THROUGH SYSTEM MANAGEMENT FACILITIES REVERSE TRANSVERSAL

FIELD OF THE INVENTION

Various implementations, and combinations thereof, are related to digital storage systems and, more specifically, to the forward recovery of catalogs.

BACKGROUND OF THE INVENTION

In a system having a computing device connected to a volume comprising stored data, a data set can be accessed directly by requesting the specific volume serial number using a fetching program. The request may be sent to the Volume Table Of Contents (VTOC), which in turns finds the exact location of the data set as well as the data set's physical information, such as record length and blocksize. However, a typical data storage system can comprise a thousand or more volumes. Additionally, many data storage systems implement an automated data allocation product that selects a volume to store data rather than allowing a user to specify preferences. The information stored on such data storage systems is typically organized into catalogs that can be utilized to locate data sets.

A catalog, in basic terms, comprises a data set containing information to locate other data sets. In turn, a data set is a unit of data storage typically consisting of a collection of logically related data in prescribed arrangements, and is stored on one or more external storage volumes. The catalog itself may not be stored on the same volumes as the data sets it describes and is capable of referring to thousands of data sets stored across numerous volumes.

For data storage systems, catalogs are critical resources. When a catalog breaks or is mistakenly deleted, a speedy and successful recovery is crucial for maintaining data access; a single user catalog could provide access to thousands of data sets supporting hundreds of applications. The most prudent course of action is to perform frequent and timely backups. However, businesses often operate storage systems for years without an incident, and therefore, do not appreciate the need to backup catalogs on a regular basis. When the business does suffer an incident, the backups, if they exist, may be too outdated to be useful. Not being prepared for such a failure, the business can incur substantial costs in terms of system downtime and the man hours involved in locating and rebuilding the catalog.

Clearly, there is a need for a method of forward catalog recovery, particularly when there are no recent backups, wherein that method minimizes down time and the time, effort, and resources, required to rebuild an accurate catalog.

SUMMARY

In one implementation, forward recovery of a catalog of a data storage system is achieved. The data storage system comprises (N) data sets encoded in (P) volumes. The method provides a recovery catalog and system management facilities ("SMF") records. An (i)th SMF entry is selected to determine if it comprises a data set change command, the (i)th SMF entry being the most recent SMF entry. If not, (i) is incremented by unity and the next SMF entry is examined. If it does, the (j)th data set is identified from the (i)th SMF entry. If the (j)th data set is already recited in the recovery catalog, (i) is incremented by unity and the next SMF entry is examined. If not, a data set location record reciting a storage address for the (j)th data set is added to the recovery catalog and (i) is incremented by unity. This process is repeated for each entry in the SMF record.

Next, a (h)th data set on a (k)th volume of the data storage system is selected. If the (h)th data set is already recited in the recovery catalog, (h) is incremented by unity and the next data set on the (k)th volume is selected. If not, a data set location record reciting the storage address for the (h)th data set is added to the recovery catalog and (h) is incremented by unity. When all of the data sets on a volume have been selected and examined (k) is incremented by unity. The process is repeated for each data set on each volume of the data storage system.

In another implementation, Applicants' invention comprises an article of manufacture comprising a computer readable medium comprising computer readable program code disposed therein for forward recovery of a catalog for a data storage system. In certain embodiments, the article of manufacture comprises a storage controller. In certain embodiments, the article of manufacture comprises a host computer. The data storage system comprises (N) data sets encoded in (P) volumes. The computer readable program code comprising a series of computer readable program steps to provide a recovery catalog and SMF records. Next the (i)th SMF entry is selected to determine if it comprises a data set change command, the (i)th SMF entry being the most recent SMF entry. If not, (i) is incremented by unity and the next SMF entry is examined. If it does, the (j)th data set is identified from the (i)th SMF entry. If the (j)th data set is already recited in the recovery catalog, (i) is incremented by unity and the next SMF entry is examined. If not, a data set location record reciting a storage address for the (j)th data set is added to the recovery catalog and (i) is incremented by unity. This process is repeated for each entry in the SMF record.

The data storage system further comprises computer readable program code comprising a series of computer readable program steps to effect selecting the (h)th data set on the (k)th volume of the data storage system. If the (h)th data set is already recited in the recovery catalog, (h) is incremented by unity and the next data set on the (k)th volume is selected. If not, a data set location record reciting the storage address for the (h)th data set is added to the recovery catalog and (b) is incremented by unity. When all of the data sets on a volume have been selected and examined (k) is incremented by unity. The process is repeated for each data set on each volume of the data storage system.

In yet another implementation, Applicants' invention comprises a computer program product encoded in a computer readable medium and useable with a programmable computer processor for forward recovery of a catalog of a data storage system. The computer program product is usable with a programmable computer processor having computer readable program code embodied therein. The data storage system comprises (N) data sets encoded in (P) volumes. The computer program product comprises computer readable program code to provide a recovery catalog and SMF records comprising (M) entries, to select an (i)th SMF entry and determine if it contains a data set change command, where the (i)th SMF entry is the most recent entry, to ascertain the (j)th data set if it is and to select the next SMF entry if it isn't, to determine if the (j)th data set is already recited in the recovery catalog, and add to a data set location record if it isn't or select the next SMF entry if it is. The computer program product further comprises computer readable program code to repeat the process for each SMF entry in the SMF record.

The computer program product additionally comprises computer readable program code to select the (h)th data set located on the (k)th volume, verify if the (h)th data set is already recited in the recovery catalog, and adding a data set location entry reciting the storage address for the (h)th data set if it isn't. Further, computer readable program code is included to repeat the process for each data set on each volume.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION OF THE PREFERRED EMBODIMENTS

Figure 1:
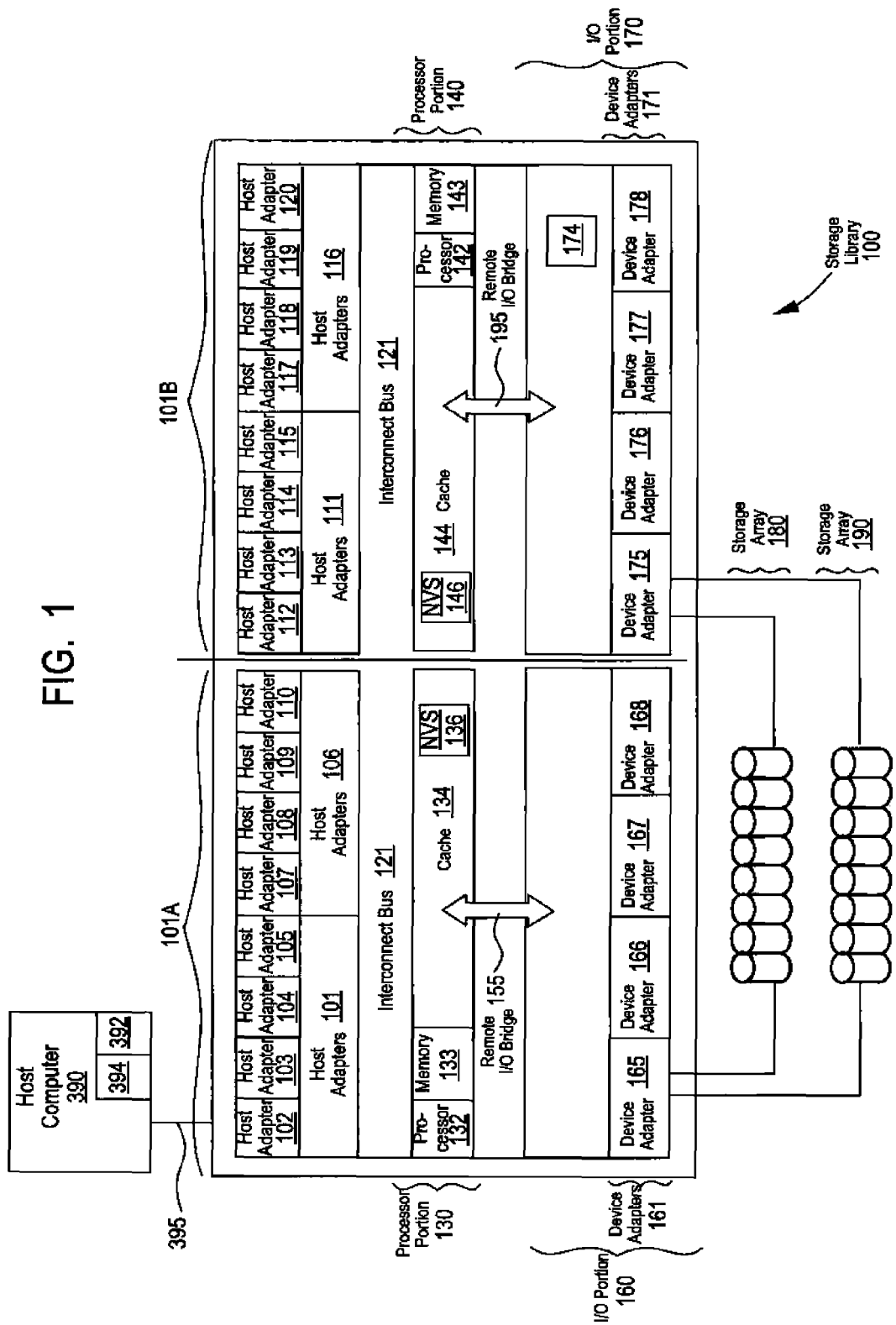
FIG. 1 is a block diagram illustrating one embodiment of an exemplary storage library comprising two clusters.

This invention is described in preferred embodiments in the following description with reference to the figures in which like numbers represent the same or similar elements. Reference throughout this specification to "one embodiment," "an embodiment," or similar language means that a particular feature, structure, or characteristic described in connection with the embodiment is included in at least on embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow-chart included are generally set forth as logical flow-chart diagrams. As such, the depicted order and labeled steps are indicative of one embodiment of the presented method. Other steps and methods may be conceived that are equivalent in function, logic, or effect to one or more steps, or portions thereat of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

In some systems, catalogs may be structured in an integrated catalog facility (ICF). An ICF catalog comprises two separate kinds of data sets: first a basic catalog structure (BCS), where a data set's name and disk storage volume location is stored; the term "catalog" means the same as BCS, and is used to describe a BCS catalog in general. For the purposes of this description, the two terms will be used interchangeably.

Secondly, an ICF catalog comprises a Virtual Sequence Access Method (VSAM) Volume Data Set (VVDS), where the physical and logical attributes of the data are stored. Though the BCS may not be physically stored on any disk volume, each VVDS is physically stored on the volume on which the data resides that it defines.

Typical systems employ two types of BCSs: (i) a master catalog containing data set location entries for all essential system data sets including those used to boot the operating system, and (ii) one or more user catalogs that identify all other data sets accessible to the system. User catalogs are connected to the master catalog, with the master catalog containing a list of aliases pointing to each user catalog.

Referring now to the illustrated embodiment of FIG. 1, data storage library 100 comprises a first cluster 101A and a second cluster 101B, wherein clusters 101A and 101B are disposed in the same housing. In the illustrated embodiment of FIG. 1, data storage system 100 comprises a plurality of host adapters 102-105, 107-110, 112-115, and 117-120, disposed in four host bays 101, 106, 111, and 116. In other implementations, the data storage system comprises fewer than 16 host adapters. Regardless of the number of host adapters disposed in any embodiments of the system, each of those host adapters comprise a shared resource that have equal access to both central processing/cache elements 130 and 140.

Each host adapter may comprise one or more Fibre Channel ports, one or more FICON ports, one or more ESCON ports, or one or more SCSI ports. Each host adapter is connected to both clusters 101A and 101B through interconnect bus 121 such that each cluster can handle I/O from any host adapter, and such that the storage controller portion of either cluster can monitor the communication path error rate for every communication path, physical and/or logical, interconnected with data storage system 100.

Storage controller portion 130 comprises processor 132 and cache 134. In certain embodiments, storage controller portion 130 further comprises computer readable medium 133. In certain embodiments, computer readable medium 133 comprises random access memory. In certain embodiments, computer readable medium 133 comprises non-volatile memory.

Storage controller portion 140 comprises processor 142 and cache 144. In certain embodiments, storage controller portion 140 further comprises computer readable medium 143. In certain embodiments, computer readable medium 143 comprises random access memory. In certain embodiments, computer readable medium comprises non-volatile memory.

When cluster 101A receives data from host computer 390, processor 132 writes that data to cache 134 and to NVS 146 disposed in cluster 101B. If cluster 101A fails before destaging the mainframe data from cache 134 to disk, then a backup copy of the mainframe data remains available in NVS 146. Similarly, when cluster 101B receives data from host computer 390, processor 142 writes that data to cache 144 and to NVS 136 disposed in cluster 101A. If cluster 101B fails before destaging the mainframe data from cache 144 to disk, then a backup copy of the mainframe data remains available in NVS 136.

I/O portion 160 comprises a plurality of device adapters, such as device adapters 165, 166, 167, and 168. I/O portion 170 further comprises a plurality of device adapters, such as device adapters 175, 176, 177, and 178.

In certain embodiments of the system, one or more host adapters, storage controller portion 130, and one or more device adapters, are packaged together on a single card disposed in the data storage system. Similarly, in certain embodiments, one or more host adapters, storage controller portion 140, and one or more device adapters, are disposed on another card disposed in the data storage system. In these embodiments, system 100 comprises two cards interconnected with a plurality of data storage devices.

In the illustrated embodiment of FIG. 1, sixteen data storage devices are organized into two arrays, namely array "A" and array "B". The illustrated embodiment of FIG. 1 shows two storage device arrays. In other embodiments, the data storage system comprises more than two storage device arrays. Each storage array appears to a mainframe as one or more logical devices.

In certain embodiments, one or more of the data storage devices comprise a plurality of hard disk drive units, such as plurality of disk drive units. In the illustrated embodiment of FIG. 1, disk array 180 and disk array 190 comprise multiple disk drives. In certain embodiments, arrays 180 and 190 utilize a RAID protocol. In certain embodiments, arrays "A" and "B" comprise what is sometimes called a JBOD array, i.e. "Just a Bunch Of Disks" where the array is not configured according to RAID. As those skilled in the art will appreciate, a RAID (Redundant Array of Independent Disks) rank comprises independent disk drives configured in an array of disk drives to obtain performance, capacity and/or reliability that exceeds that of a single large drive.

The illustrated embodiment of FIG. 1 shows two storage device arrays. In other embodiments, the system comprises a single storage device array. In yet other embodiments, the system comprises more than two storage device arrays.

As a general matter, hosts computers 390 comprises a computing device, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald).

In the illustrated embodiment of FIG. 1, host computer 390 comprises a Basic Catalog Structure (BCS) 392. BCS 392 may comprise a user catalog, containing a data set location entry for application data sets. Each data set location entry may comprise the volume serial number on which the data set resides and an address pointer to locate the Virtual Sequence Access Method (VSAM) Volume Data set (VVDS) record. The VVDS record in turn may contain additional catalog information not contained in the BCS regarding the data sets residing on the volume where the VVDS is located and describe each data set's physical attributes, statistics, and volume information. Specifically, the VVDS record comprises three types of entries: control information about BCSs which have data sets on the volume, information about the VSAM data sets on that volume, and information about the nonVSAM data sets on the volume. Alternatively, the data set location entry could comprise a pointer to a volume's table of contents (VTOC).

In other embodiments, BCS 392 may comprise a master catalog and contain data set location entries only for those data sets that are essential data sets or that are used to boot the operating system—in other words, system data sets. In yet other embodiments, BCS 392 may additionally contain aliases to other catalogs. The use of BCS 392 will subsequently be discussed in greater detail.

In one embodiment, host computer 390 may further comprise a System Management Facilities (SMF) record 394. In certain embodiments, SMF record 394 comprises facilities to collect and format information into system-related records. In certain embodiments, these records comprise information about the configuration, paging activity, and workload of the system. In certain embodiments, the records additionally comprise information about CPU time and data set activity, including when a file is deleted, defined, or extended to a new volume.

Figure 2:
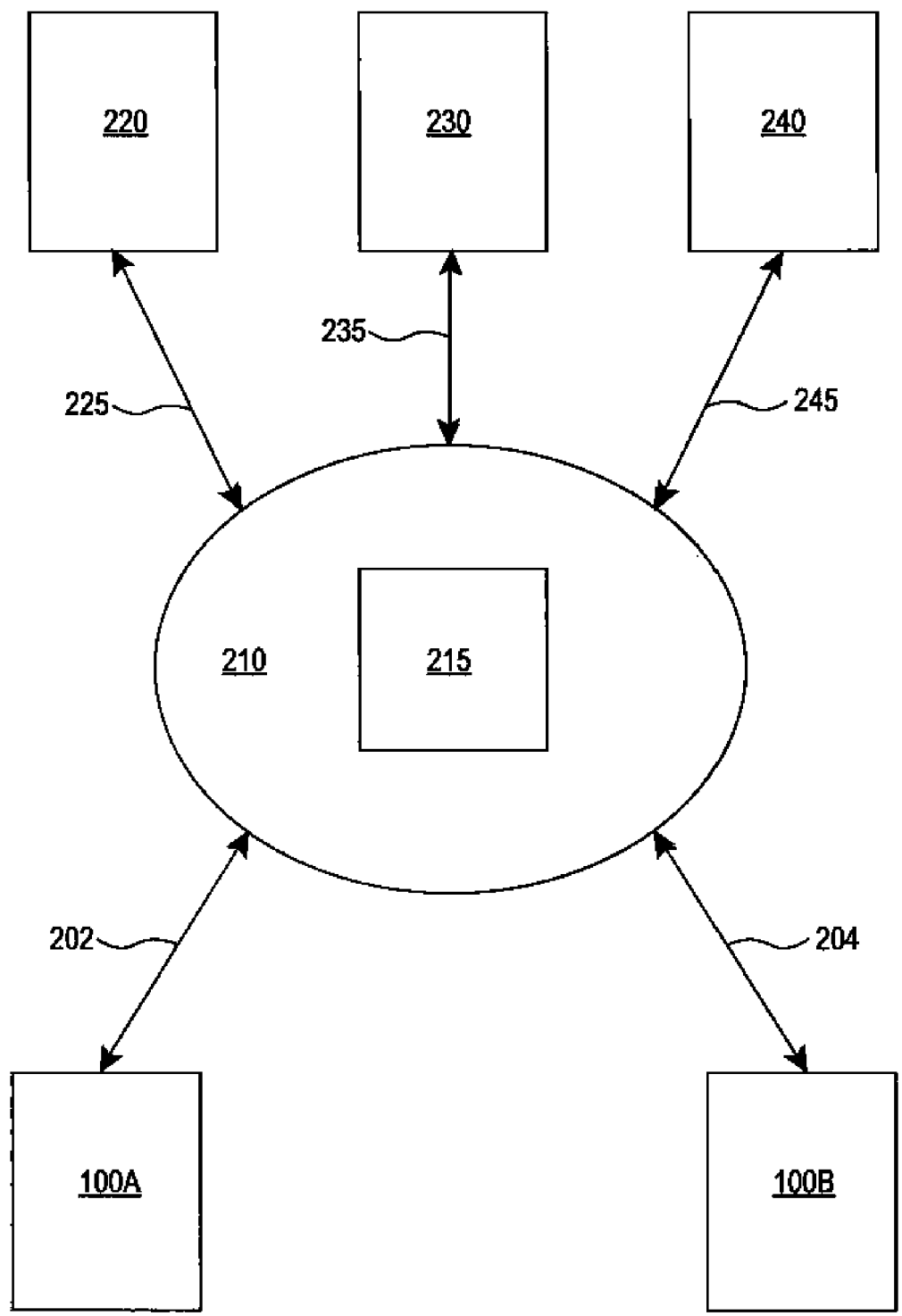
FIG. 2 is a block diagram illustrating a data storage system comprising two data storage libraries of FIG. 1, comprising a total of 4 clusters.

In the illustrated embodiment of FIG. 2, host computers 220, 230, and 240, are connected to fabric 210 utilizing I/O protocols 225, 235, and 245, respectively. I/O protocols 225, 235, and 245, may comprise any type of I/O protocol; for example, a Fibre Channel ("FC") loop, a direct attachment to fabric 210 or one or more signal lines used by host computers 225, 235, and 245, to transfer information to and from fabric 210.

In certain embodiments, fabric 210 comprises, for example, one or more FC switches 215. In certain embodiments, those one or more switches 215 comprise one or more conventional router switches. In the illustrated embodiment of FIG. 2, one or more switches 215 interconnect host computers 225, 235, and 245, to data storage libraries 100A (FIGS. 1) and 100B (FIG. 1) via 110 protocols 202 and 204, respectively. I/O protocols 202 and 204 may comprise any type of I/O interface, for example, a Fibre Channel, Infiniband, Gigabit Ethernet, Ethernet, TCP/IP, iSCSI, SCSI I/O interface or one or more signal lines used by FC switch 215 to transfer information through to and from storage libraries 100A and 100B, and subsequently data storage media.

In systems such as those described in FIGS. 1 and 2, catalogs are typically used to categorize data. As stated, an ICF catalog comprises a BCS, having data set names and disk storage volume locations, and at least one VVDS, having the physical and logical attributes of the data sets. A BCS is a VSAM key-sequenced data set using data set name entries to store and retrieve information for both VSAM and non-VSAM data sets.

A VVDS is located on each volume containing a VSAM or a storage management subsystem (SMS) managed data set that is cataloged in an ICF catalog. The VVDS is located specifically on the same volume as the data sets it describes and contains the characteristics, extent information, and the volume-related information of the VSAM data sets cataloged in the BCS.

Similar to the VVDS, each volume also comprises a volume table of contents (VTOC). The VTOC is a data set including the extent and allocation information for the volume on which it is located, including empty space as well as each space occupied by a data set. The VTOC can be used to obtain information not kept in the VVDS for all VSAM data sets and for SMS managed non-VSAM data sets.

Figure 3:
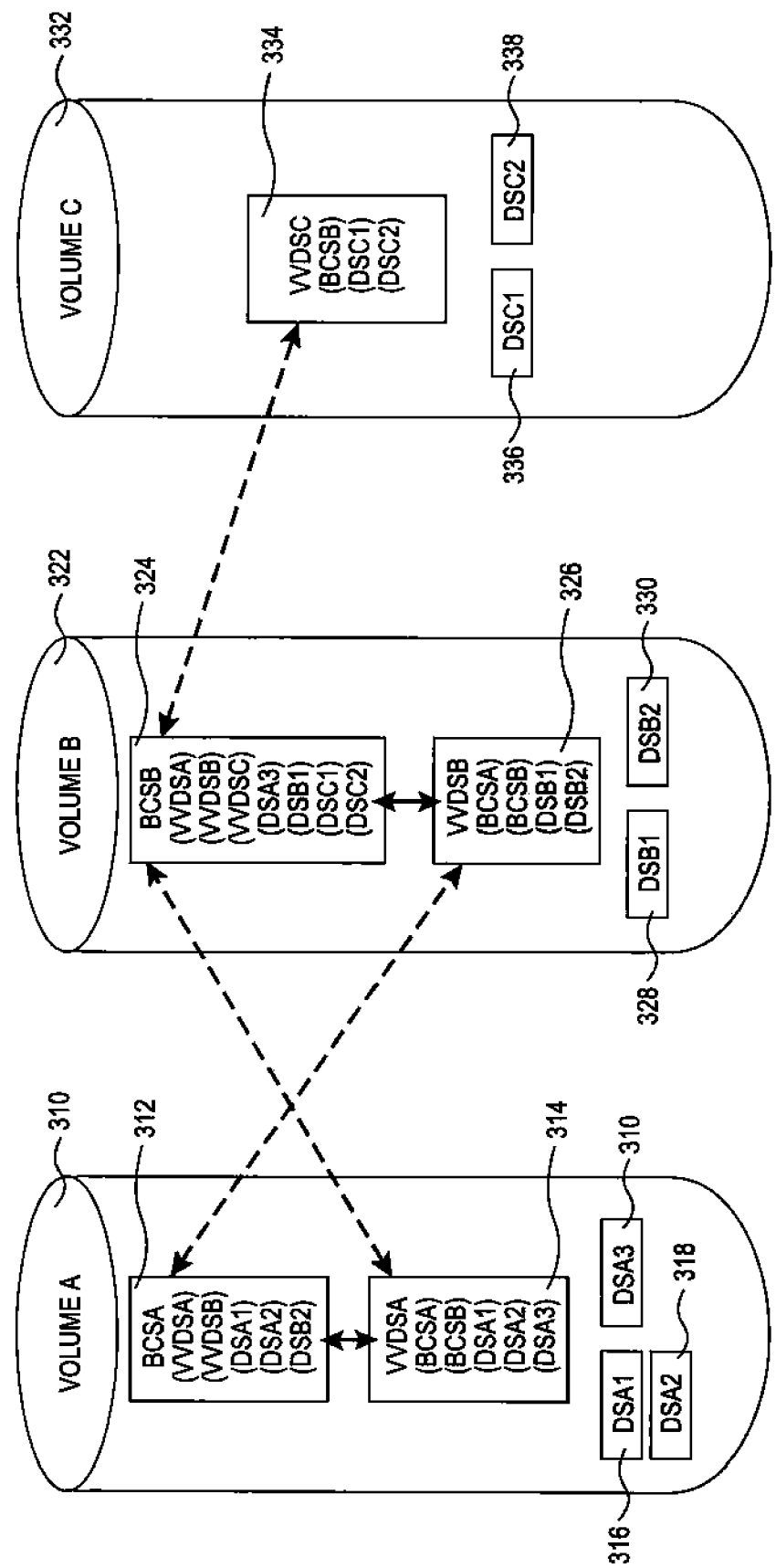
FIG. 3 is a block diagram illustrating an exemplary relationship between storage volumes, BCSs, and VVDSs.

FIG. 3 illustrates an exemplary relationship between storage volumes, BCSs, and VVDSs. As shown, on volume A (310) resides BCS A (312) along with VVDS A (314), which defines data sets A1 (316), A2 (318), and A3 (320) stored on volume A (310). Similarly, on volume B (322) resides BCS B (324) along with VVDS B (326) and data sets B1 (328) and B2 (330). Volume C (332) comprises VVDS C (334) and C1 (336) and C2 (338). As illustrated, BCS A (312) and BCS B (324) each contain records pointing to corresponding records in the VVDSs, indicated by dashed lines. The VVDSs, in turn, contain pointers to the data sets stored on the volume and reverse pointers to the BCSs.

Thus, BCS A (312) contains entries pointing to data set A1 (316) and A2 (318) in VVDS A (314) on volume A (310), as well as data set B2 (330) in VVDS B (326) on volume B (322). BCS B (324) contains records pointing to data set A3 (320) in VVDS A (314) on volume A (310), data set B1 (328) in VVDS B (326) on volume B (322), and data sets C1 (336) and C2 (338) in VVDS C (334) on volume C (332). In turn, VVDS A (314) contains a reverse pointer to BCS A (312) and B (324) as well as pointers to the data sets on volume A (310), i.e., 316, 318, and 320 likewise, VVDS B (326) points to BCS A (312) and B (324) and the data sets on volume B (322), i.e., 328 and 330. And finally, VVDS C (334) points to BCS B (324) and data sets C1 (336) and C2 (338) located on volume C (332).

A person of ordinary skill in the art will recognize that FIG. 3 is presented for illustrative purposes and not as a limitation. The present discussion is equally applicable to any number of catalogs pointing to VVDSs on any number of volumes having any number of data sets. Further, a person skilled in the art will know that each data storage volume may have more than one BCS or VVDS stored thereon. By way of example, and not by way of limitation, if a volume contains VSAM data sets comprised of multiple components, there will be multiple VVDS records describing those components. The BCS record for such a data set will then contain pointers to each VVDS record.

A person of ordinary skill in the art will also recognize that, although the present discussion focuses on VVDSs, it is equally applicable to a VTOC. A VTOC, like a VVDS, resides on a volume and lists the data sets thereon, along with the attributes of each. Additionally, for all VSAM data sets and SMS-managed non-VSAM data sets, the VTOC contains information not recorded in the VVDS. Further, when the SMS is not utilized, characteristics and location information of data sets will only be located in the VTOC and not the VVDS.

The names of data sets are typically separated into several identifying qualifiers by periods. These qualifiers both serve to group segments of the name for visual identification as well as masking capabilities. The highest level qualifiers typically identify the catalog containing the pointer to that data set. Thus, looking at FIG. 3, the names of data sets A1 (316) and A2 (318) would contain qualifiers indicating that BCS A (312) contains the pointers to their locations, whereas data set A3 (320) would have a qualifier indicating that the pointer to its location is recorded in BCS B (324). By way of example, and not by way of limitation, the name of data set A1 (316) may comprise "BCSA.VOLUMEA.LOCATION1.DSA1" whereas the name of data set A3 (320) may comprise "BCSB.VOLUMEA.LOCATION3.DSA3."

As stated, each data set location entry in the BCS allows a specific data set to be located on a volume in the storage device arrays. When the BCS fails, the data sets corresponding to the included data set location entries cannot be found and accessed by applications. However, changes to data sets are additionally captured in the SMF records along with other system information. Thus, for example, if the BCS is deleted or badly damaged, scanning the SMF records can help recovery, creating a base BCS quickly and allowing the system to locate to the most frequently accessed data sets. As previously stated, the SMF records contain data set attribute information and a record is created each time a data set is defined, deleted, or updated. Thus, the information in the SMF records can be used to build a catalog entry for a data set.

In many situations, a catalog created by parsing the SMF records is sufficient to allow the most important applications to run while a more complete BCS is recovered through examination of the volumes. This second process is slower, but allows the base BCS forward from the time of the SMF records to the current time by allowing data set location entries to be created for data sets infrequently accessed or for other reasons not having SMF record entries.

Figure 4:
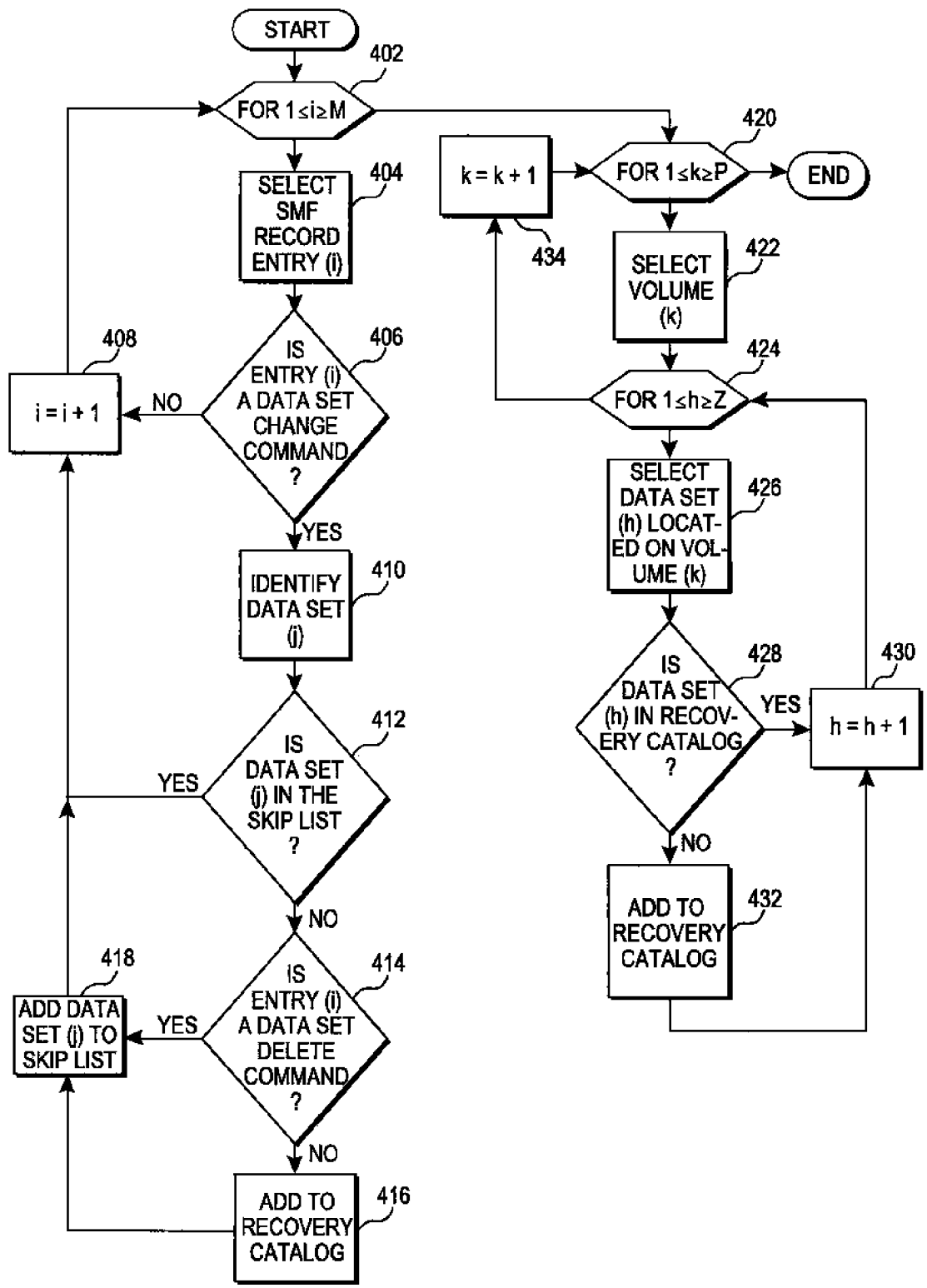
FIG. 4 is a flow chart summarizing the steps of an exemplary method for forward recovery of a catalog in a data storage system.

FIG. 4 comprises a schematic flow chart illustrating Applicants' method for recovery of a BCS. The data storage system may comprise part of a data processing system including a host computer or a main frame, a storage controller, and a communication path in communication with the host computer and the storage controller. In certain embodiments, the data processing system comprises a host computer comprising a communication path manager. In other embodiments, the data processing system comprises a host computer comprising a plurality of channel path identifiers. In yet other embodiments, the data processing system comprises a host computer interconnected with a visual display device.

In certain embodiments, the data storage system may comprise the data storage library 100 (FIG. 1), comprising two clusters, such as clusters 101A (FIG. 1) and 101B (FIG. 1), wherein each cluster comprises a storage controller portion, such as storage controller portion 130 disposed in cluster 101A and storage controller portion 140 disposed in cluster 101B.

In the exemplary embodiment of FIG. 4, the storage system comprises (N) data sets encoded in (P) volumes and a recovery BCS is generated by first querying SMF records, wherein (N) and (P) are integers having a value greater than or equal to 1. For an SMF record having (M) entries, wherein (M) is an integer having a value greater than or equal to 1, and wherein (i) greater than or equal to one and less than or equal to (M) (402), an (i)th entry in the record is selected, the (i)th entry being the most recent SMF entry (404). As will be understood by a person of ordinary skill in the art, this implies that the SMF record is examined in a reverse order, as the most recent entries are at the end of the SMF data.

The (i)th entry is then examined to determine if it comprises a data set change command (406). Data set change commands comprise commands to delete, create, or modify a data set. If the (i)th entry does not comprise a data set change command, (i) is incremented by unity (408) and 402, 404, and 406 are repeated.

Where the (i)th entry comprises a data set change command, data set (j) is identified from the entry (410). A list of data sets to skip, rather then undergo further examination, is then examined to determine if data set (j) is included (412). If yes, then (i) is incremented by unity (408) and 402, 404, 406, 410, and 412 are repeated. If no, then the (i)th entry is examined to determine if it was a command to delete data set (j) (414) and, therefore, data set (j) should not be included in the recovery BCS. If the (i)th entry was a command to delete data set (j) then data set (j) is added to the list of data sets to skip (418). If not, then a data set location entry for the (j)th data set is added to the recovery BCS (416) and to the list of data sets to skip (418), and (i) is incremented by unity (408).

When (i) is greater than (M), each entry in the SMF record has been examined. As stated, the recovered BCS will now typically contain location identifiers for the most frequently used data sets and many of the systems vital applications will be functional. However, to completely restore the BCS, and examination of the volumes is needed.

For (k) greater than or equal to one and less than or equal to (P) (420), where (P) is the total number of volumes in the data storage system, a (k)th volume is then selected (422), wherein (k) is initially set to 1. Where the (k)th volume comprises (Z) data sets stored thereon, for (h) greater than or equal to one and less than or equal to (Z) (424), a (h)th data set of the (k)th volume is selected (426), wherein (h) is initially set to 1. The recovery BCS is then checked to determine if it already contains a data set location entry for the (h)th data set (428). If yes, (h) is incremented by unity (430) and 424, 426, and 428 are repeated. If no, a record of the (h)th data set's location is added to the recovery BCS (432), (h) is incremented by unity (416), and 424, 426, and 428 are repeated.

If (h) is greater than Z (424) then (k) is incremented by unity (434), a new volume is selected and 420, 422, 424, 426, 428, and 432 are repeated until all volumes in the data storage system have been inspected.

In some embodiments, the volumes of the data storage system may be examined in a preferential order. This order may be determine by the access amount of the volume, with volumes that are accessed more frequently being examined first. In other embodiments, the order may be based on another characteristic of the volume.

In certain embodiments, individual steps recited in FIG. 4 may be combined, eliminated, or reordered.

In certain embodiments, instructions, such as instructions 136 (FIG. 1) and/or 146 (FIG. 1), reside in computer readable medium 133 (FIG. 1) and/or 143 (FIG. 1), respectively, wherein those instructions are executed by a processor, such as processor 132 (FIG. 1), and/or 142 (FIG. 1), to perform one or more of steps recited in FIG. 4.

In other embodiments, the invention comprises instructions residing in any other computer program product, where those instructions are executed by a computer external to, or internal to, data storage system 100 (FIG. 1), to perform one or more of steps recited in FIG. 4. In either case, the instructions may be encoded in computer readable medium comprising, for example, a magnetic information storage medium, an optical information storage medium, an electronic information storage medium, and the like. In certain embodiments, by "electronic storage media," Applicants mean, for example and without limitation, one or more devices, such as and without limitation, a PROM, EPROM, EEPROM, Flash PROM, compactflash, smartmedia, and the like.

The following examples are presented to further illustrate to persons skilled in the art how to make and use the invention. These examples are not intended as a limitation, however, upon the scope of the invention.

By way of illustrative example, an SMF record may have 100 entries, i.e., M=100. Each entry is examined in reverse chronological order, beginning with the most recent entry. Entries 100 through 89 may, for example, not be data set change commands and therefore not require further examination. However, the 88th entry, for example, may contain a modify command for data set A. If a data set location entry for data set A is not contained in a list identifying data sets that do not require additional examination and the 88th entry was not to delete data set A, a record in the recovery BCS catalog is added and the 87th entry in the SMF record is selected for examination. By way of illustration only, entries 72, 53, 52, and 24 may result in additional data set location entries being added to the recovery BCS for, for example, data sets C, D, E, and F respectively.

Once each of the 100 entries in the SMF record have been parsed, each volume in the data storage system can be examined. By way of example, the data storage system may have 3 volumes, i.e., P=3. The first volume is selected and the data sets encoded thereon examined to determine if they have been included in the recovery BCS. Specifically, the first volume may have, for example, 4 data sets, i.e., Z=4. The first and second data sets may, for example, correspond to data sets C and D and are already included in the recovery BCS. The third data set, however, may comprise data set G. As the recovery catalog does not yet have a data set location entry for data set G, one is added. The fourth data set on the first volume is then examined.

Once each data set on the first volume have been checked for inclusion on the recovery BCS, the second volume is examined. By way of example, the second volume may have only two data sets, i.e., Z=2. This time the first data set may correspond to the already included data set A but the second may comprise data set H. Once a data set location entry is included for data set H, the third and last volume can be examined in the same manner as the first and second.

In one implementation, the data storage system may have multiple BCSs, only one of which needs to be recovered. In such a situation, the exemplary method depicted in FIG. 5 may be used. In a storage system again having (N) data sets encoded in (P) volumes, a recovery BCS can be generated by first querying the SMF records. For an SMF record having (M) entries, where (i) greater than or equal to one and less than or equal to M (502), the (i)th entry in the record is selected, the (i)th entry being the most recent SMF (504). The (i)th entry is then examined to determine if it is a data set change command (506). If not, (i) is incremented by unity (508) and 502, 504, and 506 are repeated.

Where the (i)th entry is a data set change command, data set (j) is identified from the entry (510). A list containing data sets upon which further examination can be foregone is consulted to determine if data set (j) is included (512). If yes, (i) is incremented by unity (508) and 502, 504, 506, and 510 are repeated.

If the list does not include data set (j), then the high level qualifiers in the name of the (j)th data set are examined to determine the catalog containing the "locate" pointer to that data set (514). By way of example, and not by way of limitation, the (j)th data set's name may read "user1.volume.location.name," indicating that the pointer to the data set is located in the catalog User1. If User1 is not the catalog being replaced or repaired, then the data set should not be included in the recovery BCS. As such, data set (j) is added to the list of data sets that do not require further examination (516), (i) is incremented by unity (508), and 502, 504, 506, 510, and 512 are repeated. If it is, the (i)th entry is checked to determine if it was a command to delete data set (j), thereby indicating that data set (j) should not be included in the recovery BCS (518). If the (i)th entry is a command to delete data set (j), data set (j) is added to the list of data sets to skip (516), (i) is again incremented by unity (508), and 502, 504, 506, 510, 512 and 514 are repeated. If it isn't, then a data set location entry for the (j)th data set is added to the recovery BCS (520) and to the list of data sets to skip (418) and (i) is incremented by unity (508).

As with the method illustrated in FIG. 4, when (i) is greater than (M), the each entry in the SMF record has been inspected. For (k) greater than or equal to one and less than or equal to (P) (522), where (P) is the total number of volumes in the data storage system, the (k)th volume is then selected (524). Where the (k)th volume comprises (Z) data sets stored thereon, for (h) greater than or equal to one and less than or equal to (Z) (526), the (h)th data set record of the (k)th volume is selected from the VTOC (528). As before, the highest qualifiers of the (h)th data set are examined to determine if the location pointer to the (h)th data set was in the catalog being replaced by the recovery BCS (530). If no, (h) is incremented by unity (532) and 526, 528, and 530 are repeated. If yes, then the recovery catalog is checked to verify whether it already contains a data set entry location for the (j)th data set (534). If yes, then (h) is incremented by unity (532) and 526, 528, 530, and 534 are repeated. If no, then a data set location entry is for the (j)th data set is added to the recovery BCS (536), (h) is incremented by unity (532) and 526, 528, 528, 530, 534, and 536 are repeated.

If (h) is greater than Z (526) then (k) is incremented by unity (538) and a new volume is selected, 522, 524, 526, 528, 530, 534, and 536 being repeated until all of the volumes in the data storage system have been examined.

In yet another implementation, the data storage system may have multiple BCSs, but the data sets may be SMS managed, allowing the VVDS to be used rather than the VTOC. As will be known by an individual of ordinary skill in the art, the VVDS for an SMS managed volume contains an entry for every data set on the volume. In comparison, for a non-SMS managed volume, the VVDS only contains entries for VSAM data sets and, therefore, the VTOC must be used instead as described in FIG. 5 as the VVDS may not contain the entire list of data sets that reside on the volume.

Figure 6:
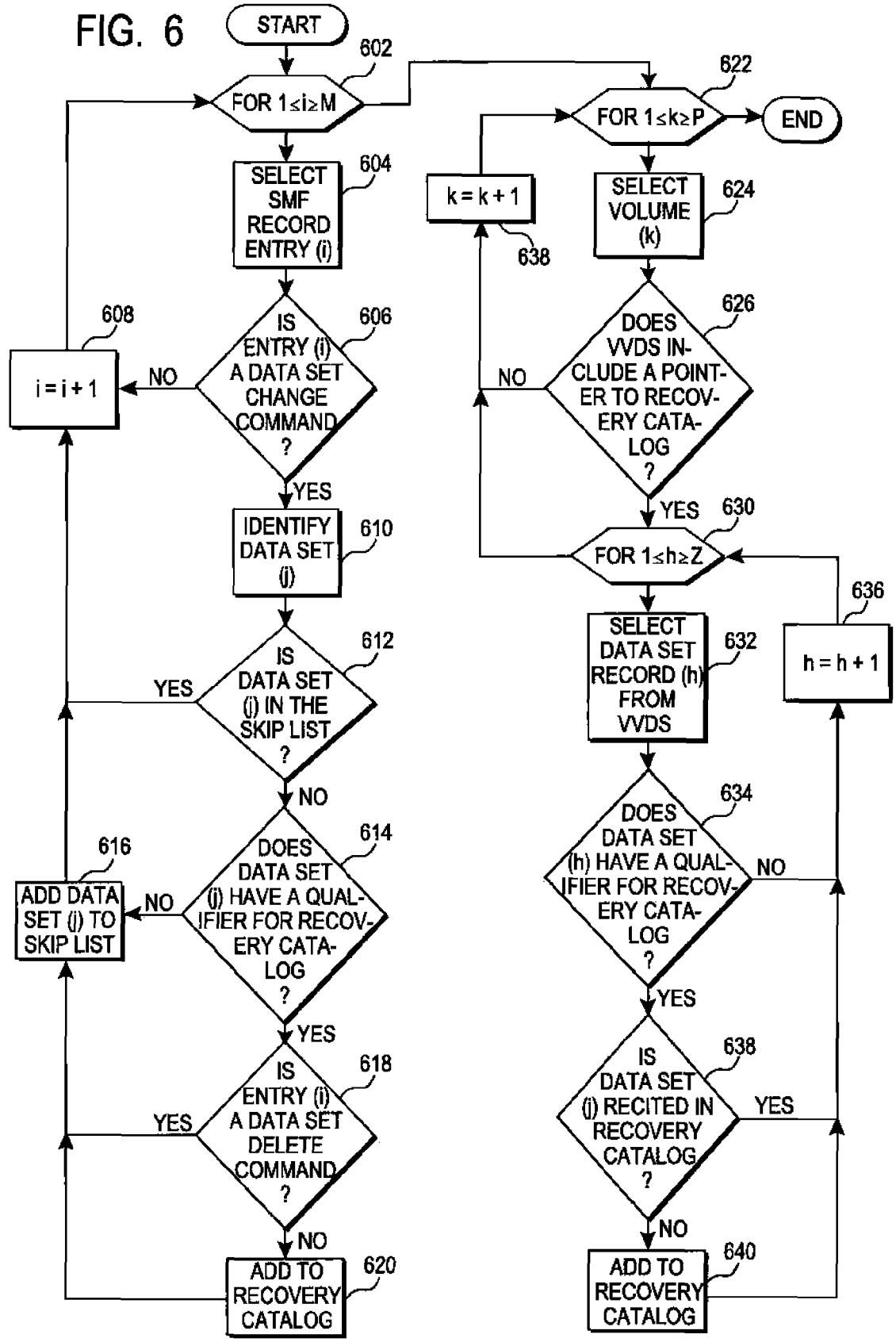
FIG. 6 is a flow chart summarizing the steps of the exemplary method of FIG. 5 where a volume comprises a VVDS.

When the VVDS can be employed, the exemplary method depicted in FIG. 6 may be used. As in the previous embodiment, the storage system again comprises (N) data sets encoded in (P) volumes. For an SMF record having (M) entries, where (i) greater than or equal to one and less than or equal to M (602), the (i)th entry in the record is selected, the (i)th entry being the most recent entry (604). The (i)th entry is then examined to determine if it is a data set change command (606), and if not, (i) is incremented by unity (608) and 602, 604, and 606 are repeated.

Where the (i)th entry is a data set change command, data set (j) is identified from the entry (610). A list containing data sets for which further examination can be skipped is then checked to determine if the list contains data set (j) (612). If the list does, then (i) is incremented by unity (608) and 602, 604, 606, and 610 are repeated.

If data set (j) is not contained on the list, then the high level qualifiers in the (j)th data set's name are examined to ascertain the catalog containing the "locate" pointer to data set (j) (614). If the qualifier does not identify the catalog being replaced or repaired, then data set (j) is added to the list of data sets to skip (616), (i) is incremented by unity (608,) and 602, 604, 606, 610 and 612 are repeated. If it is, then the (i)th entry is examined to determine if it was a command to delete data set (j) and, therefore, data set (j) should not be included in the recovery BCS (618). If the (i)th entry is a command to delete the (j)th data set, the (j)th data set is added to the list of data sets to skip (616), (i) is incremented by unity (608,) and 602, 604, 606, 610 612, and 614 are repeated. If not, then a data set location entry for the (j)th data set is added to the recovery BCS (620) and to the list of data sets to skip (616), and (i) is incremented by unity (608).

Figure 5:
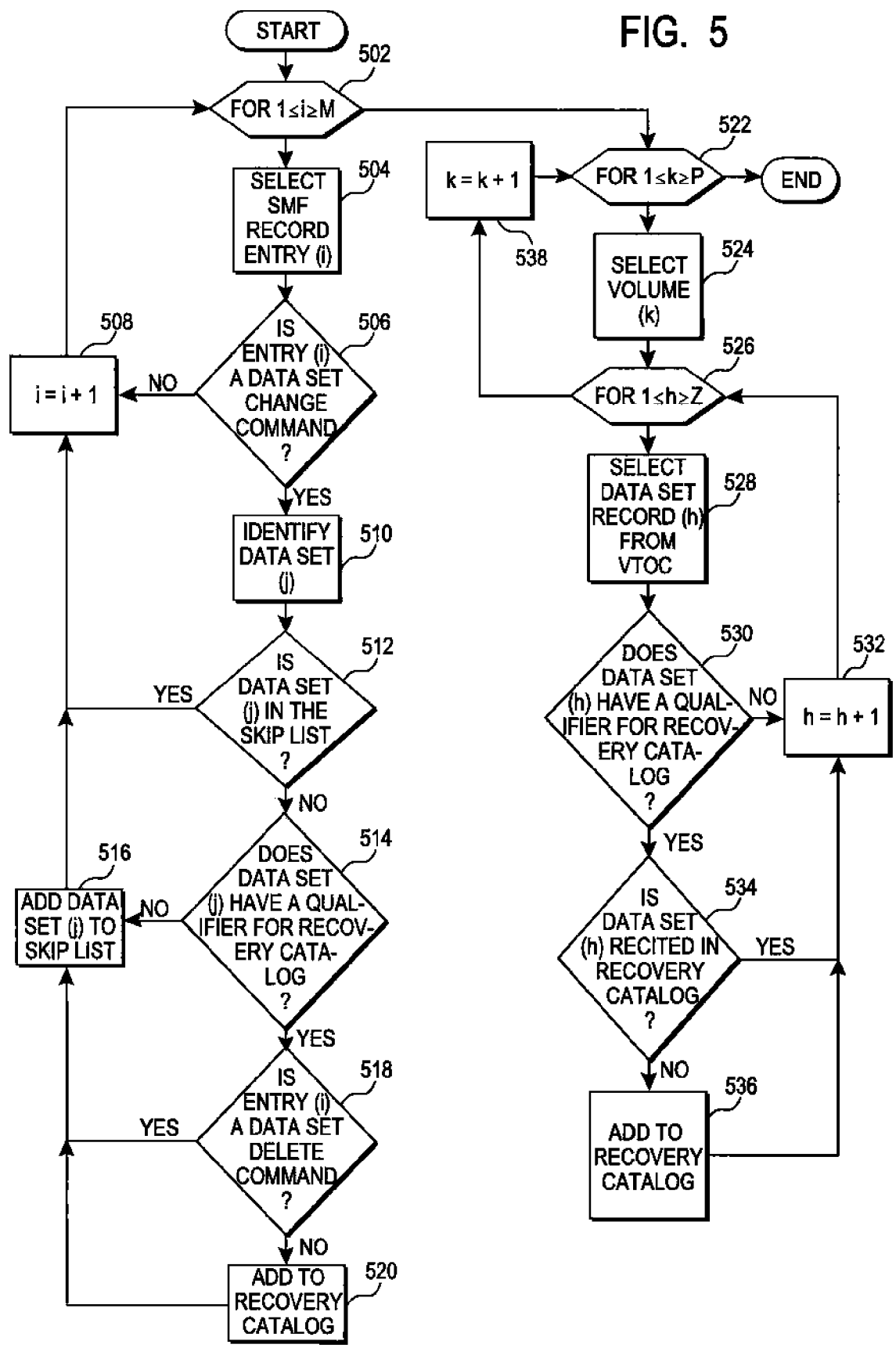
FIG. 5 is a flow chart summarizing the steps of an exemplary method for forward recovery of a catalog in a data storage system where qualifiers of data set names are examined.

As with the methods illustrated in FIGS. 4 and 5, when (i) is greater than (M), the each entry in the SMF record has been examined. For (k) greater than or equal to one and less than or equal to (P) (622), where (P) is the total number of volumes in the data storage system, the (k)th volume is then selected (624). The VVDS of the (k)th volume is examined to verify if it contains a reverse pointer to the catalog being replaced or repaired by the recovery BCS (626). If no, then none of the data sets contained on the (k)th volume had data set location entries in the catalog being replaced or repaired by the recovery BCS, and (k) is incremented by unity (628) and 622, 624, and 626 repeated.

If the VVDS of the (k)th volume does contain a pointer to the recovery BCS, then the data set entries of the VVDS are inspected. For (h) greater than or equal to one and less than or equal to (Z) where (Z) is the total number of data sets encoded on the (k)th volume, (630), the (h)th data set is selected from the VVDS (632). As before, the highest qualifiers of the (h)th data set are examined to ascertain if the pointer to the (h)th data set was in the catalog being replaced by the recovery BCS (634). If no, (h) is incremented by unity (636) and 630, 632 and 634 are repeated. If yes, then the recovery catalog is checked to verify whether it already contains a data set entry location for the (j)th data set (638). If yes, then (h) is incremented by unity (636) and 630, 632, 634, and 638 are repeated. If no, then a data set location entry is for the (j)th data set is added to the recovery BCS (640), (h) is incremented by unity (636) and 630, 632, 634, 638, and 640 are repeated.

When (h) is greater than Z (630), (k) is incremented by unity (628) and a new volume is selected, 622, 624, 626, 630, 634, 638, and 640 being repeated until all of the volumes in the data storage system have been examined.

In certain embodiments, individual steps recited in FIG. 5 or FIG. 6 may be combined, eliminated, or reordered.

In certain embodiments, instructions, such as instructions 136 (FIG. 1) and/or 146 (FIG. 1), reside in computer readable medium 133 (FIG. 1) and/or 143 (FIG. 1), respectively, wherein those instructions are executed by a processor, such as processor 132 (FIG. 1), and/or 142 (FIG. 1), to perform one or more of steps recited in FIG. 5 or FIG. 6.

In other embodiments, the invention comprises instructions residing in any other computer program product, where those instructions are executed by a computer external to, or internal to, data storage system 100 (FIG. 1), to perform one or more of steps recited in FIG. 5 or FIG. 6. In either case, the instructions may be encoded in computer readable medium comprising, for example, a magnetic information storage medium, an optical information storage medium, an electronic information storage medium, and the like. "Electronic storage media," may mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for forward recovery of a catalog for a data storage system comprising a plurality of data sets encoded in a plurality of volumes, comprising:
    examining system management facilities ("SMF") records to identify datasets recited therein;
    adding to a recovery catalog one or more datasets identified in said SMF records;
    reviewing seriatim each of said plurality of volumes;
    identifying any additional datasets encoded in said plurality of volumes, wherein said additional datasets were not recited in said SMF records;
    adding said additional datasets to said recovery catalog, wherein said plurality of datasets comprise (N)

data sets encoded in (P) volumes, wherein (N) and (P) are greater than or equal to 1, wherein said examining further comprises:
retrieving said SMF records, wherein said SMF records comprises (M) entries, wherein (M) is greater than or equal to 1;
choosing an (i)th SMF entry, wherein said (i)th SMF entry comprises the most recent SMF entry, wherein (i) is initially set to 1, and wherein (i) is less than or equal to (M);
determining if an (i)th SMF entry comprises a data set change command;
operative if said (i)th SMF entry does not comprise a data set change command, incrementing (i) by unity;
operative if said (i)th SMF entry comprises a data set change command;
identifying a (j)th data set recited in said (i)th SMF entry; ascertaining if said (j)th data set is recited in said recovery catalog;
operative if said 0)th data set is recited in said recovery catalog, incrementing (i) by unity; and
operative if said (j)th data set is not recited in said recovery catalog, adding to said recovery catalog a data set location record reciting a storage address for said (j)th data set and increment (i) by unity;
establishing if (i) is greater than (M);
operative if (i) is not greater than 0VI), repeating said selecting, said determining said identifying, and said ascertaining.

2. The method of claim 1, wherein said reviewing step further comprises:
choosing a (k)th volume, wherein the (k)th volume comprises (Z) datasets, and wherein (Z) is greater than or equal to 1 and less than or equal to (N), and wherein (k) is initially set to 1;
selecting a 0a)th data set located on the (k)th volume, wherein 0a) is initially set to 1, and wherein (11) is greater than or equal to 1 and less than or equal to (Z);
verifying if said 0a)th data set is recited in said recovery catalog; operative if said (h)th data set is recited in said recovery catalog, increment (h) by unity;
operative if said (h)th data set is not recited in said recovery catalog, adding to said recovery catalog a data set location record reciting a storage address for said 0a)th data set and incrementing 0a) by unity;
determining if (h) is greater than (Z);
operative if(h) is greater than (Z):
incrementing (k) by unity;
assessing if (k) is greater than (P); and
operative if (k) is not greater than (P), setting (h) to 1and repeating said electing, said verifying, said resolving; and
operative if (h) is not greater than (Z), repeating said verifying, said resolving, and said assessing.

3. The method of claim 1, wherein said identifying further comprises:
detecting a qualifier of the (j)th data set wherein said qualifier indicates whether a data set location record for the (j)th data set is to be included in said recovery catalog; and
operative if said qualifier indicates the location pointer is not to be included in said recovery catalog, incrementing (i) by unity and repeating said selecting, said determining, and said identifying.

4. The method of claim 2, wherein said selecting further comprises:
detecting a qualifier of the (h)th data set wherein said qualifier indicates whether a data set location record for the (h)th data set is to be included in said recovery catalog; and
operative if said qualifier indicates the location pointer is not to be included in said recovery catalog, incrementing (h) by unity and repeat said selecting electing.

5. The method of claim 2, wherein said (h)th data set is selected from a volume table of contents ("VTOC") located on the (k)th volume.

6. The method of claim 2, wherein said (h)th data set is selected from a Virtual Sequence Access Method ("VSAM") Volume Data Set ("VVDS") located on the (k)th volume.

7. The method of claim 6, further comprising:
checking if said VVDS comprises a reverse pointer indicating that a catalog being replaced by said recovery catalog contained a location pointer to said VVDS; and
operative if said VVDS does not comprise said reverse pointer, incrementing (k) by unity and repeating said choosing and said electing.

8. A computer program product encoded in a computer readable medium and useable with a programmable computer processor to generate a recovery catalog for a data storage system comprising a plurality of data sets encoded in a plurality of volumes, the computer program product comprising:
computer readable program code which causes said programmable processor to generate a recovery catalog;
computer readable program code which causes said programmable processor to examine system management facilities ("SMF")records to identify datasets recited therein;
computer readable program code which causes said programmable processor to add one or more datasets identified in said SMF records to said recovery catalog;
computer readable program code which causes said programmable processor to review seriatim each of said plurality of volumes;
computer readable program code which causes said programmable processor to identify additional datasets encoded in said plurality of volumes, wherein said additional datasets were not recited in said SMF records;
computer readable program code which causes said programmable processor to add said additional datasets to said recovery catalog,
wherein said plurality of datasets comprise (N) data sets encoded in (P) volumes, wherein (N) and (P)are greater than or equal to 1, wherein said computer readable program code which causes said programmable processor to examine system management facilities ("SMF") records further comprises:
computer readable program code which causes said programmable processor to retrieve said SMF records, wherein said SMF records comprises (M) entries, wherein (M) is greater than or equal to 1;
computer readable program code which causes said programmable processor to select an (i)th SMF entry, wherein said (i)th SMF entry comprises the most recent SMF entry, and wherein (i) is initially set to 1 and is less than or equal to (M);
computer readable program code which causes said programmable processor to determine if said (i)th SMF entry comprises a data set change command;
computer readable program code which, if said (i)th SMF entry does not comprise a data set change command, causes said programmable processor to increment (i) by unity;

computer readable program code which, if said (i)th SMF entry comprises a data set change command, causes said programmable processor to:
identify an (j)th data set, wherein (j) is greater than or equal to 1 and less than or equal to (N);
ascertain if said (j)th data set is recited in said recovery catalog;
computer readable program code which, if said (j)th data set is recited in said recovery catalog, causes said programmable processor to increment (i) by unity; and
computer readable program code which, if said (j)th data set is not recited in said recovery catalog, causes said programmable processor to add to said recovery catalog a data set location record reciting a storage address for said (j)th data set and increments (i) by unity.

9. The computer program product of claim 8, wherein said computer readable program code which causes said programmable processor to review seriatim each of said plurality of volumes further comprises:
computer readable program code which causes said programmable processor to choose a (k)th volume, wherein the (k)th volume comprises (Z) datasets, and wherein (Z) is greater than or equal to 1 and less than or equal to (N), and wherein (k) is initially set to 1;
computer readable program code which causes said programmable processor to select a (h)th data set located on the (k)th volume, wherein (h) is initially set to 1 and wherein 0a) is greater than or equal to 1 and less than or equal to (Z);
computer readable program code which causes said programmable processor to determine if said (h)th data set is recited in said recovery catalog;
computer readable program code which, if said (h)th data set is recited in said recovery catalog, causes said programmable processor to increment (h) by unity;
computer readable program code which, if said 0a)th data set is not recited in said recovery catalog, causes said programmable processor to add to said recovery catalog a data set location record reciting a storage address for said 0a)th data set and increments (h) by unity.

10. The computer program product of claim 8, wherein said computer readable program code which causes said programmable processor to identify an (j)th data set, further comprises:
computer readable program code which causes said programmable processor to detect a qualifier of the (j)th data set wherein said qualifier indicates whether a data set location record for the (j)th data set is to be included in said recovery catalog.

11. The computer program product of claim 9, wherein said computer readable program code which causes said programmable processor to select an (h)th dataset further comprises:
computer readable program code which causes said programmable processor to detect a qualifier of the (h)th data set wherein said qualifier indicates whether a data set location record for the (h)th data set is to be included in said recovery catalog.

12. The computer program product of claim 9, wherein said computer readable program code which causes said programmable processor to select a (h)th data set further comprises computer readable program code which causes said programmable processor to select a (h)th data set from a volume table of contents ("VTOC") located on the (k)th volume.

13. The computer program product of claim 9, wherein said computer readable program code which causes said programmable processor to select a (h)th data set further comprises computer readable program code which causes said programmable processor to select a (h)th data set from a Virtual Sequence Access Method ("VSAM") Volume Data Set ("VVDS") located on the (k)th volume.

14. The computer program product of claim 13, further comprising:
computer readable program code which causes said programmable processor to determine if said VVDS comprises a reverse pointer indicating that a catalog being replaced by said recovery catalog contained a location pointer to said VVDS.

15. The computer program product as defined in claim 14, wherein said computer readable program code which causes said programmable processor to select a (k)th volume further comprises computer readable program code which causes said programmable processor to select a (k)th volume based on a characteristic.

16. An article of manufacture comprising a computer readable medium comprising computer readable program code disposed therein to generate a recovery catalog for a data storage system comprising a plurality of data sets encoded in a plurality of volumes, the computer readable program code comprising a series of computer readable program steps to effect:
examining system management facilities ("SMF") records to identify datasets recited therein;
adding one or more datasets identified in said SMF records to a recovery catalog;
reviewing seriatim each of said plurality of volumes;
identifying additional datasets encoded in said plurality of volumes, wherein said additional datasets were not recited in said SMF records;
adding said additional data sets to said recovery catalog, wherein said data storage system comprises (hi) data sets encoded in (P) volumes, wherein (N) and (P) are greater than or equal to 1, wherein said computer readable program code to examine system management facilities further comprising a series of computer readable program steps to effect:
retrieving said SMF records, wherein said SMF records comprise (M) entries, wherein (M) is greater than or equal to 1;
selecting an (i)th SMF entry, wherein said (i)th SMF entry comprises the most recent SMF entry, wherein (i) is initially set to 1, and wherein (i) is less than or equal to (M);
determining if said (i)th SMF entry comprises a data set change command;
operative if said (i)th SMF entry does not comprise a data set change command, increment (i) by unity;
operative if said (i)th SMF entry comprises a data set change command:
identifying an (j)th data set, wherein (j) is greater than or equal to 1 and less than or equal to (N);
ascertaining if said (j)th data set is recited in said recovery catalog;
operative if said (j)th data set is recited in said recovery catalog, increment (i) by unity; and
operative if said (j)th data set is not recited in said recovery catalog, adding to said recovery catalog a data set location record reciting a storage address for said (j)th data set and increment (i) by unity.

17. The article of manufacture of claim 16, wherein said computer readable program code to review seriatim each of said plurality of volumes further comprising a series of computer readable program steps to effect:

choosing a (k)th volume, wherein the (k)th volume comprises (Z) datasets, and wherein (Z) is greater than or equal to 1 and less than or equal to (N), and wherein (k) is initially set to 1;

selecting a (h)th data set located on the (k)th volume, wherein 0a) is initially set to 1, and wherein (h) is greater than or equal to 1 and less than or equal to (Z);

determining if said (h)th data set is recited in said recovery catalog;

operative if said (h)th data set is recited in said recovery catalog, increment (h) by unity, operative if said (h)th data set is not recited in said recovery catalog, adding to said recovery catalog a data set location record reciting a storage address for said (h)th data set and increment (h) by unity.

18. The data storage system as defined in claim 16, wherein said computer readable program code for identifying a (j)th dataset further comprises a series of computer readable program steps to effect:

detecting a qualifier of the (j)th data set wherein said qualifier indicates whether a data set location record for the (j)th data set is to be included in said recovery catalog.

19. The data storage system as defined in claim 17, wherein said computer readable program code for selecting a (h)th dataset further comprises a series of computer readable program steps to effect:

detecting a qualifier of the (h)th data set wherein said qualifier indicates whether a data set location record for the (h)th data set is to be included in said recovery catalog.

20. The data storage system as defined in claim 17, wherein said computer readable program code for selecting a (h)th dataset further comprises a series of computer readable program steps to effect selecting said (h)th dataset from a volume table of contents ("VTOC") located on the (k)th volume.

21. The data storage system as defined in claim 17, wherein said computer readable program code for selecting a (h)th dataset further comprises a series of computer readable program steps to effect selecting said (h)th dataset from a Virtual Sequence Access Method ("VSAM") Volume Data Set ("VVDS") located on the (k)th volume.

22. The data storage system as defined in claim 21, wherein said computer readable program code further comprises a series of computer readable program steps to effect detecting if said VVDS comprises a reverse pointer indicating that a catalog being replaced by said recovery catalog contained a location pointer to said VVDS.

* * * * *